US012693212B2

(12) United States Patent
　　Georges des Aulnois et al.

(10) Patent No.: US 12,693,212 B2
(45) Date of Patent: Jul. 28, 2026

(54) MEASURING DEVICE FOR ABSORPTION-SPECTROSCOPIC GAS MEASUREMENT, USE OF SPINEL, POLYCRYSTALLINE ALUMINUM OXIDE OR ALUMINUM OXYNITRIDE AND METHOD FOR ABSORPTION-SPECTROSCOPIC GAS MEASUREMENT

(71) Applicant: M & C TechGroup Germany GmbH, Ratingen (DE)

(72) Inventors: Johann Georges des Aulnois, Versailles (FR); Michael Lohr, Engen (DE); Hans-Jorg Rumm, Oberhausen (DE)

(73) Assignee: M & C TechGroup Germany GmbH, Ratingen (DE)

( * ) Notice: Subject to any disclaimer, the term of this patent is extended or adjusted under 35 U.S.C. 154(b) by 114 days.

(21) Appl. No.: 18/702,379

(22) PCT Filed: Dec. 20, 2022

(86) PCT No.: PCT/EP2022/087036
§ 371 (c)(1),
(2) Date: Apr. 18, 2024

(87) PCT Pub. No.: WO2023/118171
PCT Pub. Date: Jun. 29, 2023

(65) Prior Publication Data
US 2024/0410820 A1　　Dec. 12, 2024

(30) Foreign Application Priority Data
Dec. 20, 2021　(EP) ..................................... 21216057

(51) Int. Cl.
　　*G01N 21/25* (2006.01)
　　*G01N 21/39* (2006.01)
(52) U.S. Cl.
　　CPC .......... *G01N 21/255* (2013.01); *G01N 21/39* (2013.01); *G01N 2021/399* (2013.01); *G01N 2201/0636* (2013.01)
(58) Field of Classification Search
　　CPC .. G01N 21/255; G01N 21/39; G01N 21/8507; G01N 21/3504; G01N 21/031;
(Continued)

(56) References Cited

U.S. PATENT DOCUMENTS 6,118,520 A 　 9/2000 　Harner
8,299,433 B2 * 10/2012 　Majewski ............ G01N 21/031
　　　　　　　　　　　　　　　　250/336.1
(Continued)

FOREIGN PATENT DOCUMENTS

DE 　20 2008 013 557 U1 　3/2009
EP 　　　2 065 738 A1 　6/2009
(Continued)

OTHER PUBLICATIONS

International Search Report from corresponding International Patent Application No. PCT/EP2022/087036, dated Apr. 24, 2023.
(Continued)

*Primary Examiner* — Tarifur R Chowdhury
*Assistant Examiner* — Carlos Perez-Guzman
(74) *Attorney, Agent, or Firm* — Renner, Otto, Boisselle & Sklar, LLP

(57) ABSTRACT

The invention relates to a measuring device for absorption-spectroscopic gas measurement, the use of spinel, polycrystalline aluminum oxide or aluminum oxynitride and a method for absorption-spectroscopic gas measurement.

14 Claims, 3 Drawing Sheets

(58) Field of Classification Search
CPC ....... G01N 2021/399; G01N 2021/151; G01N 2021/852; G01N 2021/0314; G01N 2201/0636
See application file for complete search history.

(56) References Cited

U.S. PATENT DOCUMENTS

| | | | | |
|---|---|---|---|---|
| 2009/0141273 A1* | 6/2009 | Poulter | ................. | G01N 21/05 |
| | | | | 356/326 |
| 2015/0192468 A1* | 7/2015 | Pearman | ............... | H04B 1/406 |
| | | | | 356/451 |
| 2022/0074865 A1* | 3/2022 | Tate | .................. | G01N 21/8507 |
| 2024/0053265 A1* | 2/2024 | Alden | ............... | G01N 33/0075 |

FOREIGN PATENT DOCUMENTS

| | | | | |
|---|---|---|---|---|
| GB | 1 426 230 | 6/1973 | | |
| JP | H0344521 A | 2/1991 | | |
| JP | 2018115994 A | 7/2018 | | |
| JP | 2019513987 A | 5/2019 | | |
| JP | 2022536232 A | 8/2022 | | |
| WO | WO-2020/142138 A1 | 7/2020 | | |
| WO | WO-2021156731 A1 * | 8/2021 | ............ | G01J 5/0813 |

OTHER PUBLICATIONS

Notice of Reasons for Rejection issued in related Japanese Patent Application No. 2024-546364 mailed Apr. 22, 2025.
Examination Report issued in related India Patent Application No. 202447046015 dated Mar. 17, 2026.

* cited by examiner

MEASURING DEVICE FOR ABSORPTION-SPECTROSCOPIC GAS MEASUREMENT, USE OF SPINEL, POLYCRYSTALLINE ALUMINUM OXIDE OR ALUMINUM OXYNITRIDE AND METHOD FOR ABSORPTION-SPECTROSCOPIC GAS MEASUREMENT

FIELD OF THE INVENTION

The invention relates to a measuring device for absorption-spectroscopic gas measurement, the use of spinel, polycrystalline aluminum oxide or aluminum oxynitride and a method for absorption-spectroscopic gas measurement.

BACKGROUND OF THE INVENTION

Absorption spectroscopic gas measurement is usually carried out by laser absorption spectroscopy and in particular by diode laser absorption spectroscopy using tunable lasers, also known as TDLAS (Tunable Diode Laser Absorption Spectroscopy). This spectroscopy is particularly suitable for gas measurement, especially for determining the chemical and/or physical parameters of a gas. Laser absorption spectroscopy is particularly advantageous for determining the concentration of a gas in a gas mixture. In addition to the concentration, the temperature, pressure, velocity and mass flow of a gas can also be determined, for example.

A measuring device for absorption-spectroscopic gas measurement by means of diode laser absorption spectroscopy using tunable lasers (TDLAS) comprises in particular a radiation device through which a laser beam can be generated, a reflective element through which the laser beam can be reflected, and at least one detection element through which a laser beam can be detected. The radiation device can be in particular a laser diode, through which a tunable laser beam can be generated. The laser beam generated by the radiation device can be guided along a first optical axis to the reflective element and the laser beam reflected by the reflective element can then be guided along a second optical axis from the reflective element to the detection element.

For absorption spectroscopic gas measurement using such a TDLAS, a gas mixture to be measured is irradiated with the laser beam as it travels along the first optical axis and the second optical axis. During this irradiation of the gas, the emission wavelength of the tunable diode laser is tuned to the characteristic absorption bands of the gas to be measured in the gas mixture, which leads to a reduction in the radiation intensity of the laser beam due to the absorption. This reduction in radiation intensity leads to a reduction in the signal intensity measured by the detection element, which can then be used for gas measurement, in particular for determining the gas concentration of the gas in the gas mixture. It is known that the gas concentration can be determined using the Beer-Lambert law, for example.

The diode laser to be used can be selected depending on the gas to be measured and the desired tuning range. For example, DFB (Distributed Feedback Laser) lasers can cover wavelength ranges between 700 nm and 3 μm, VCSEL (Vertical Cavity Surface Emitting Laser) lasers can cover wavelength ranges up to around 2.1 μm, ICL (Interband Cascade Laser) lasers can cover wavelength ranges between 2.8 μm and 5.8 μm and QCL (Quantum Cascade Laser) lasers can cover wavelength ranges above 3.5 μm.

TDLAS can be used to measure gases that have at least one characteristic absorption band or absorption line in these wavelength ranges, for example oxygen ($O_2$), carbon dioxide ($CO_2$), carbon monoxide (CO), nitrogen oxides ($NO_x$), ammonia ($NH_3$), hydrogen sulphide ($H_2S$), sulphur oxides ($SO_x$), hydrogen halide compounds (HCl, HF), formaldehyde ($CH_2O$), water vapor ($H_2O$) or mixtures thereof.

A particular challenge in the use of TDLAS is the use of a suitable reflective element, as this must have numerous, very special properties. For example, the reflective element must be transparent and reflective, particularly in the wavelength range of the laser beam that is generated by the radiation device and directed to the reflective element. Furthermore, the reflective element must be resistant to aggressive gases with which it may come into contact during gas measurement and must also be able to withstand high temperatures. Furthermore, the reflective element should be easy to clean in the event of contamination.

Reflective elements made of sapphire are regularly used in the state of the art. However, these have numerous disadvantages. For example, sapphire is birefringent, so that the reflected laser beam is broken up into several beams. Another disadvantage is the technically complex processing of sapphire. Finally, sapphire is also disadvantageous from an economic point of view due to its high price.

In addition, reflective elements made of YAG (yttrium aluminum garnet) are also regularly used in the state of the art. However, these are disadvantageous due to the high raw material costs.

Due to these disadvantages, quartz is also sometimes used as a reflective element. However, quartz can only be used for wavelength ranges below around 3 μm.

It is an object of the invention to provide a measuring device for absorption spectroscopic gas measurement, in particular in the form of a TDLAS, with an alternative reflective element. In particular, the reflective element should also be usable for wavelengths above 3 μm and in particular also in the mid-infrared wavelength range. According to a further object, the reflective element should not be birefringent. According to a further object, the reflective element should be chemically and thermally resistant, in particular resistant to aggressive gases and at high temperatures. According to a further object, the reflective element should be easy to clean. Finally, according to a further object, the reflective element should be economically advantageous to provide, i.e. in particular be easy to process and be available at the lowest possible cost.

SUMMARY OF THE INVENTION

To solve these objects, a measuring device for absorption-spectroscopic gas measurement is provided, comprising
  a radiation device through which a laser beam can be generated;
  a reflective element through which a laser beam can be reflected;
  at least one detection element through which a laser beam can be detected;
  a first optical axis along which a laser beam generated by the radiation device can be guided to the reflective element; and
  a second optical axis along which a laser beam reflected by the reflective element can be guided to the detection element; wherein
  the reflective element is selected from the following group: spinel, polycrystalline aluminum oxide, aluminum oxynitride.

The invention is based on the surprising finding that spinel, polycrystalline aluminum oxide or aluminum oxynitride can be used as a reflective element for a measuring device for absorption spectroscopic gas measurement, in particular in the form of a TDLAS.

Spinel, or more precisely magnesia spinel, is a mineral of the spinel group with the chemical composition $MgAl_2O_4$, which crystallizes in the cubic crystal system. Surprisingly, the invention has shown that spinel can be used particularly advantageously as a reflective element in a measuring device for absorption spectroscopic gas measurement, in particular in a TDLAS. In this respect, spinel is transparent to a laser beam in a broad wavelength range and a laser beam can be reflected by the spinel. In this respect, spinel is transparent in a wavelength range from about 0.3 to 5.6 μm and thus in particular also in the mid-infrared wavelength range, in particular also above 3 μm.

Polycrystalline aluminum oxide, also known as "PCA" (polycrystalline alumina), is a high-density ceramic made of aluminum oxide. Usually, polycrystalline alumina is produced by pressing and subsequent sintering of powdered alumina. Preferably, the polycrystalline aluminum oxide used in the present invention is produced from very fine aluminum oxide powder, particularly preferably with a grain size of less than 1 μm. Particularly preferably, the polycrystalline alumina is present as transparent polycrystalline alumina, i.e., as so-called TPCA (Transparent Polycrystalline Alumina). Surprisingly, it has been found according to the invention that polycrystalline aluminum oxide can be advantageously used as a reflective element in a measuring device for absorption spectroscopic gas measurement, in particular in a TDLAS. In this respect, polycrystalline aluminum oxide is transparent to a laser beam in a broad wavelength range and a laser beam can be reflected by the polycrystalline aluminum oxide. In this respect, polycrystalline aluminum oxide is transparent in a wavelength range from about 0.3 μm to about 5.6 μm and thus in particular also in the mid-infrared wavelength range and in particular also above 3 μm.

Aluminum oxynitride is a ceramic material consisting of the elements aluminum, oxygen and nitrogen, also known as "ALON". Surprisingly, the invention has shown that aluminum oxynitride can be advantageously used as a reflective element in a measuring device for absorption spectroscopic gas measurement, in particular in a TDLAS. In this respect, aluminum oxynitride is transparent to a laser beam in a broad wavelength range and a laser beam can be reflected by the aluminum oxynitride. In this respect, aluminum oxynitride is transparent in a wavelength range from about 0.3 μm to about 5.2 μm and thus in particular also in the mid-infrared wavelength range and in particular also above 3 μm.

In particular, however, spinel, polycrystalline aluminum oxide and aluminum oxynitride are not birefringent, so that the laser beam can be reflected particularly advantageously by spinel, polycrystalline aluminum oxide and aluminum oxynitride, since the laser beam is not broken up into several beams when reflected by each of these substances. Furthermore, spinel, polycrystalline aluminum oxide and aluminum oxynitride are particularly resistant to aggressive gases and high temperatures. Finally, spinel, polycrystalline aluminum oxide and aluminum oxynitride are easy to clean and can be provided economically advantageous, as they are easy to process, in particular easier than sapphire, and can be provided at low cost, in particular lower cost than sapphire. However, the advantage of using these substances as a reflective element in a measuring device for absorption spectroscopic gas measurement, in particular in a TDLAS, is that these substances can be coated very well, in particular with an anti-reflective coating (AR coating), as explained in more detail below.

Although spinel, polycrystalline aluminum oxide and aluminum oxynitride, as described above, are equally advantageous as reflective elements in a measuring device for absorption spectroscopic gas measurement, in particular in a TDLAS, spinel is particularly preferred as such a reflective element according to the invention, since it has the best properties in terms of transmission, reflection, resistance, cleanability, coatability and cost.

According to a preferred embodiment, the reflective element has a coating. In a particularly preferred embodiment, the reflective element has an anti-reflective coating (AR coating). Alternatively or cumulatively, the reflective element may have an anti-scratch coating or a thermal barrier coating.

According to a preferred embodiment, the reflective element has a coating selected from the following group: $Al_2O_3/SiO_2$, $TiO_2/Al_2O_3$, $TiO_2/SiO_2$, $Ta_2O_5$ or $MgF_2$. According to the invention, it has been found that each of the above substances or mixtures of substances can be used to provide an AR coating which also forms scratch protection and temperature protection for the reflective element. According to the invention, the reflective element particularly preferably has a coating of $Ta_2O_5$ (tantalum pentoxide). According to the invention, it was surprisingly found that by coating the reflective element with $Ta_2O_5$ the reflective in the wavelength range from about 3,425 to 3,650 nm could be reduced to less than 0.05%.

To coat the reflective element with a coating, in particular a coating of one of the above substances or mixtures of substances, the technologies known from the state of the art for applying a coating can be used, for example chemical vapor deposition (CVD) or physical vapor deposition (PVD).

According to a particularly preferred embodiment, the reflective element is a retroreflector. As is known, a retroreflector (also known as a triple prism) is a device by which incident electromagnetic waves, in particular light or laser beams, are largely reflected in the direction from which they came, irrespective of the direction of incidence in relation to the orientation of the device. The design of the reflective element as a retroreflector also has the particular advantage that the laser beam reflected by the reflective element can be reflected particularly easily and effectively onto the detection element.

According to a preferred embodiment, the reflective element has an incident surface via which a laser beam generated by the radiation device can be introduced into the reflective element, the incident surface being designed as a flat surface which is aligned at an angle not equal to 90° to the first optical axis. Such an inclination of the incident surface to the first optical axis also has the particular advantage that any radiation components of the laser beam reflected at the incident surface are not reflected in the direction of the incident laser beam, so that interference with the incident laser beam can be avoided. According to a preferred embodiment, the normal is aligned to the incident surface at an angle in the range of >0 to 5°, more preferably at an angle in the range of 1 to 5° and particularly preferably at an angle of 3° to the first optical axis.

Preferably, the radiation device of the measuring device according to the invention is a laser diode, particularly preferably a tunable laser diode. According to a preferred embodiment, a laser diode is used in the form of a laser diode, in particular in the form of a tunable laser diode, which is selected from the following group: Interband cascade lasers, quantum cascade lasers.

An interband cascade laser, also known as an ICL (interband cascade laser), is a laser diode for emitting wavelengths in the range from around 2.8 μm to 5.8 μm.

A quantum cascade laser, also known as a QKL or QCL (quantum cascade laser), is a laser diode for emitting wavelengths in the range from around 3.5 μm to at least around 14 μm.

Although interband cascade lasers and quantum cascade lasers, as explained above, are equally advantageous as lasers in the measuring device according to the invention, an interband cascade laser is particularly preferably used as a laser according to the invention.

Preferably, the radiation device, in particular the tunable laser diode, is a laser diode tunable over 2.0 μm to 5.0 μm.

According to the invention, it has been found that a laser diode tunable over this wavelength range interacts particularly advantageously with the reflective element in the form of spinel, polycrystalline aluminum oxide or aluminum oxynitride, since these substances are optically transparent to the laser beam in this wavelength range and reflect the laser beam particularly advantageously, especially in this wavelength range.

In principle, the detection element can take the form of any detection element known from the prior art for detecting a laser beam. According to a preferred embodiment, the at least one detection element comprises at least one photodetector. As is known, a photodetector is an electronic component that converts light into an electrical signal using the photoelectric effect or shows an electrical resistance that is dependent on the incident radiation. According to a particularly preferred embodiment, the at least one detection element comprises at least one photodetector in the form of a photodiode.

The laser beam detected by the detection element can be converted into an electrical signal by the detection element, which is then evaluated according to the known methods for gas measurement. To measure the concentration of the gas to be measured, the laser beam detected by the detection element can be evaluated, for example, using the Beer-Lambert law to determine the gas concentration. Preferably, the evaluation is carried out by means of evaluation electronics. The evaluation electronics can be a component of the measuring device according to the invention or can also be present in the form of separate evaluation electronics. Such evaluation electronics can be present in accordance with the evaluation electronics known to TDLAS.

According to a preferred embodiment, a laser beam generated by the radiation device can be guided along a section of the first optical axis through a gas mixture. Along this section of the first optical axis, the laser beam can interact with the gas to be measured in the gas mixture or the radiation intensity of the laser beam can be reduced due to absorption with the gas in this section. According to a further development of this idea of the invention, a laser beam generated by the radiation device can also be guided through the gas mixture along a section of the second optical axis or the laser beam reflected by the reflective element can be guided through the gas mixture along a section of the second optical axis. Due to the absorption with the gas to be determined, the radiation intensity of the laser beam is further reduced during the second passage through the gas mixture along a section of the second optical axis. This greater reduction in the radiation intensity can be detected all the more clearly by the at least one detection device and the gas measurement can therefore be measured and evaluated all the more reliably.

According to a preferred embodiment, the measuring device according to the invention comprises a probe, wherein the section of the first optical axis extends in the probe. According to a further development of this inventive concept, the section of the second optical axis also extends in the probe. In particular, the probe can be designed in such a way that it can be introduced into a gas mixture. By introducing the probe into a gas mixture, a laser beam generated by the radiation device can be guided through the gas mixture along a section of the first optical axis and the second optical axis.

According to a preferred embodiment, the measuring device according to the invention further comprises a device for dispensing a purge gas, by means of which the reflective element or the spinel, the polycrystalline aluminum oxide or the aluminum oxynitride can be surrounded by a purge gas. This allows the reflective element to be protected from aggressive gases in the gas mixture.

Moreover, the measuring device according to the invention can comprise any other components known from the prior art for TDLAS. In particular, the measuring device according to the invention can, for example, have transmitting optics, i.e., for example one or more lenses and/or mirrors, through which a laser beam generated by the radiation device can be optically shaped. Furthermore, the measuring device can have receiving optics, for example one or more lenses and/or mirrors, through which a laser beam reflected by the reflective element can be shaped before it strikes the at least one detection element.

Preferably, one or more mirrors are used as the transmitting optics and receiving optics and particularly preferably no lenses are used, and particularly preferably in particular if an interband cascade laser or a quantum cascade laser is used as the laser. This is because a lens always has a certain amount of reflection, to which such a laser reacts very sensitively. Such reflection can be reduced or practically completely suppressed by using mirrors as receiving optics.

It is also an object of the invention to use a reflective element selected from the following group: spinel, polycrystalline aluminum oxide, aluminum oxynitride, through which a laser beam can be reflected in a measuring device for absorption spectroscopic gas measurement, in particular in a diode laser absorption spectroscope using a tunable laser (TDLAS). This use is particularly preferred, as described above, with the proviso that spinel is used.

In practical use, the measuring device according to the invention can be operated as follows.

The radiation device, in particular a tunable laser diode, generates a laser beam, in particular in a wavelength range from 2.0 μm to 5.0 μm. The generated laser beam can be guided along the first optical axis to the reflective element, if necessary, after beam shaping by an optical transmitter. On this path, the laser beam is preferably guided along a section of the first optical axis through a gas mixture which comprises a gas to be determined, in particular a gas whose concentration in the gas mixture is to be determined. The laser beam is reflected by the reflective element. The reflective element in the form of spinel, polycrystalline aluminum oxide or aluminum oxynitride is preferably a retroreflector, whereby the reflective element also preferably has an anti-reflective coating and the incident surface of the reflective element is preferably oriented at an angle oblique to the first optical axis. The laser beam reflected by the reflective element is reflected along the second optical axis to the at least one detection element, wherein the laser beam is optionally shaped by a receiving optical system and then impinges on the at least one detection element, particularly preferably a photodiode of the at least one detection element. Along the second optical axis, the laser beam is again preferably guided along a section through the gas mixture, whereby the laser beam again interacts with the gas to be measured in the gas mixture and thereby further loses radiation intensity. The laser beam impinging on the at least one detection element, in particular the photodiode, is then detected by the at least one detection element, in particular converted into an electrical signal by the at least one detection element, which is then evaluated, preferably by means of evaluation electronics, and the gas to be measured is measured, in particular its concentration in the gas mixture is determined.

According to the invention, it has been found that the measuring device according to the invention can be advantageously used for determining the gas concentration, in particular for determining the gas concentration of at least one of the following gases, in particular in a gas mixture: $C_2H_2$, $C_2H_4$, $C_2H_6$, $CH_2O$, $CH_3Cl$, $CH_4$, CO, $CO_2$, CS, $CS_2$, $H_2$, $H_2O$, $H_2S$, HBr, HCl, HCN, HF, HI, HOCl, $N_2$, $N_2O$, $NH_3$, NO, $NO_2$, $O_3$, OCS, $PH_3$, $SO_2$, $SO_3$.

Preferably, the measuring device according to the invention is used to determine the gas concentration of at least one of the following gases, in particular in a gas mixture: $C_2H_4$, $C_2H_6$, $CH_2O$, CO, NO, $NO_2$, $SO_2$, $SO_3$.

The measuring device according to the invention is particularly preferably used to determine the gas concentration of formaldehyde ($CH_2O$), especially in a gas mixture.

Another object of the invention is the use of the measuring device according to the invention for determining the concentration of gaseous formaldehyde in a gas mixture.

Another object of the invention is a method for absorption-spectroscopic gas measurement, comprising the following steps:

provision of a measuring device according to the invention;

generating of a laser beam by the radiation device;

detection of the laser beam by the detection element;

carrying out a gas measurement based on the detection.

The generation of the laser beam, the detection of the laser beam and the carrying out of the gas measurement based on the detection can be carried out as described herein.

Further features of the invention can be seen from the claims, the figures and the associated description of the figures.

All features of the invention can be combined with each other, individually or in combination, as desired.

BRIEF DESCRIPTION OF THE DRAWINGS

One exemplary embodiment of the invention is explained in more detail with reference to the following description of the figures.

DETAILED DESCRIPTION OF THE INVENTION

Figure 1:
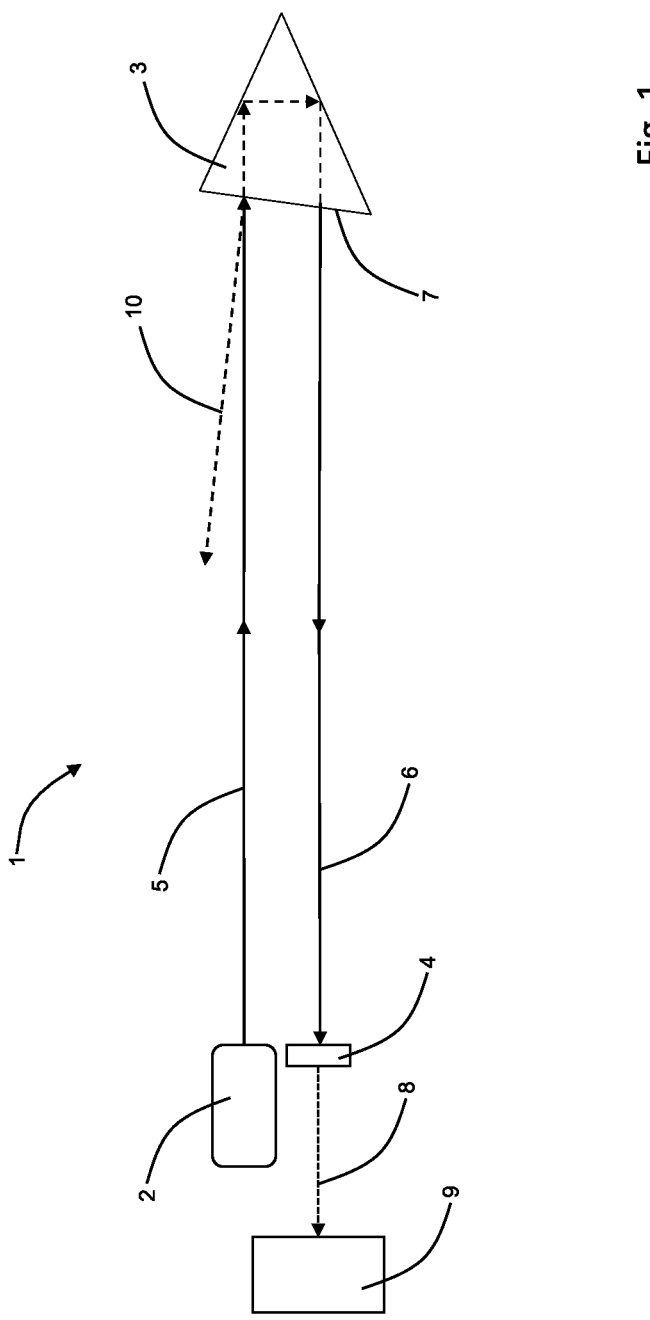
FIG. 1 is a schematic representation of an exemplary embodiment of a measuring device according to the invention.

FIG. 1 shows an embodiment of a measuring device according to the invention for absorption-spectroscopic gas measurement. The measuring device, marked in its entirety with the reference sign 1, is designed to carry out tunable diode laser absorption spectroscopy (TDLAS). The measuring device 1 comprises a radiation device 2 in the form of a laser diode, through which a laser beam can be generated. The measuring device 1 also comprises a reflective element 3, through which a laser beam generated by the radiation device 2 can be reflected, in the form of a spinel. Finally, the measuring device 1 comprises a detection element 4, through which a laser beam can be detected, in the form of a photodiode. A laser beam that can be generated by the radiation device 2 can be guided along a first optical axis 5 to the reflective element 3. A laser beam reflected by the reflective element 3 can be guided along a second optical axis 6 to the detection element 4.

The spinel or reflective element 3 is designed as a retroreflector or triple prism and has an anti-reflective coating of $Ta_2O_5$ applied by means of PVD.

The spinel or the reflective element 3 has an incident surface 7 via which a laser beam generated by the radiation device 2 can be directed into the spinel 3, whereby the incident surface 7 is designed as a flat surface whose normal is aligned at an angle of 3° to the first optical axis 5.

The laser diode 2 is an interband cascade laser that can be tuned over a wavelength of 3,627 nm to 3,633 nm (for the gas to be measured here, formaldehyde).

The detection element 4 includes a photodiode, through which a laser beam detected by the detection element 4 can be converted into an electrical signal. The detection element 4 is coupled via an electronic data line 8 to an electronic evaluation unit 9, which can evaluate the electrical signals generated by the detection element 4. In the exemplary embodiment, the evaluation electronics are in the form of an electronic data processing device.

The measuring device 1 is designed to determine the concentration of gaseous formaldehyde ($CH_2O$) in a gas mixture.

Figure 3:
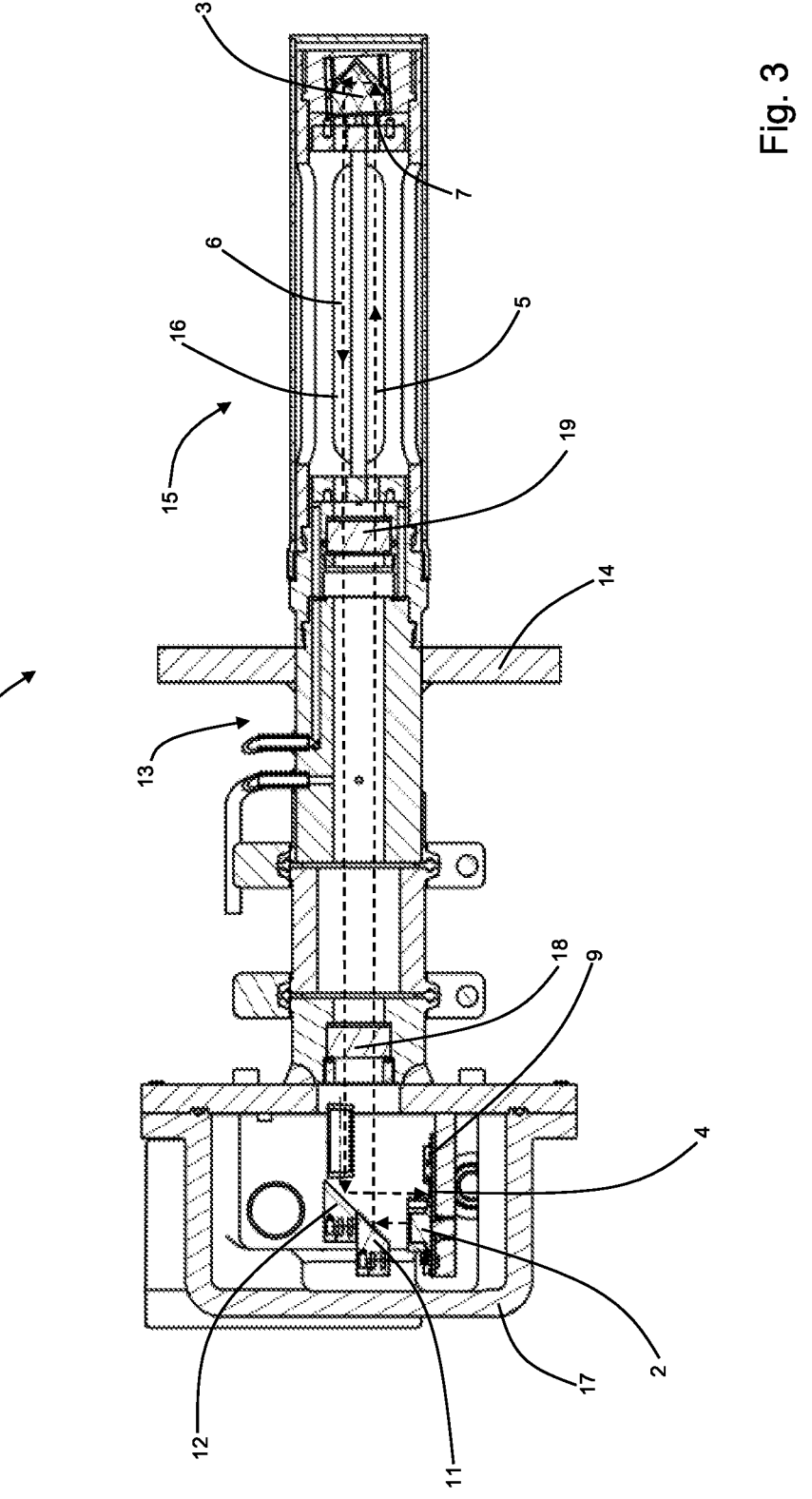
FIG. 3 is another exemplary embodiment of a measuring device according to the invention.

In order to be able to determine the concentration of formaldehyde in a gas mixture by the measuring device 1, the latter expediently has a probe, which is realized in a practical embodiment of the measuring device 1 as shown in FIG. 3. A laser beam generated by the radiation device 2 can be guided through the gas mixture along a section of the first optical axis 5 and along a section of the second optical axis 6, each of which extends in the probe.

In practical use, the measuring device 1 is used as follows to determine the concentration of formaldehyde in a gas mixture.

The measuring device 1 is initially arranged in such a way that a section of the first optical axis 5 and the second optical axis 6 run through a gas mixture in which the concentration of formaldehyde is to be determined. A laser beam is generated by the radiation device 2, which is initially directed along the first optical axis 5 to the reflective element or spinel 3, is introduced into the reflective element via the incident surface 7 and is reflected by the reflective element 3. The path of the laser beam in the reflective element 3 is indicated by dashed lines. The reflected laser beam is then guided along the second optical axis 6 to the detection element 4, where it is detected, converted into an electrical signal and this electrical signal is transmitted to the evaluation electronics 9 via the electronic data line 8. The laser beam generated by the radiation device 2 is periodically modulated in a predetermined wavelength range, whereby this wavelength range comprises at least one absorption band of formaldehyde. This reduces the radiation intensity of the laser beam as it passes through the gas mixture. This reduction in the radiation intensity of the laser beam is detected by the detection element 4 and the concentration of formaldehyde in the gas mixture is determined by the evaluation electronics 9 on the basis of this detection.

By using a spinel as a reflective element 3, this determination of the concentration of formaldehyde in the gas mixture can be carried out particularly reliably. This is because the spinel does not break up the laser beam and also proves to be resistant to a hot and aggressive gas mixture. Furthermore, the spinel proves to be transparent for the required wavelengths. As the spinel is also designed as a retroreflector, the laser beam entering the spinel is reflected in the direction or parallel to the direction from which the laser beam entered the spinel along the first optical axis 5.

Furthermore, the inclination of the incident surface 7 to the first optical axis 5 can prevent interference of the laser beam introduced into the spinel with a radiation component of the laser beam reflected at the incident surface 7. In this respect, any radiation component of the laser beam reflected at the incident surface 7 is not reflected in the direction of the incident laser beam, but rather at an angle to it, as indicated by the arrow 10.

Figure 2:
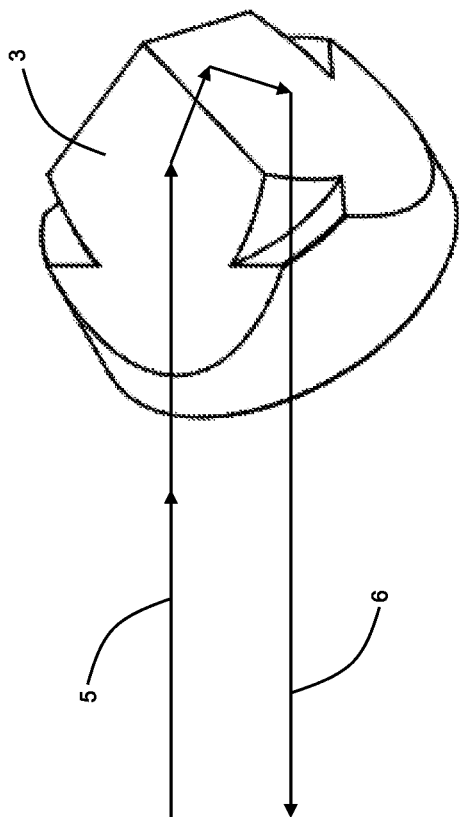
FIG. 2 is a perspective view of an exemplary embodiment of a spinel used as a reflective element according to the invention.

The spinel of the reflective element 3 shown only schematically in FIG. 1 is shown in more detail in a perspective view in FIG. 2. FIG. 2 clearly shows that the reflective element 3 is designed as a retroreflector or triple prism. The beam path in the reflective element 3 is indicated by arrows in FIG. 2, whereby the laser beam is first introduced into the reflective element 3 along the first optical axis 5, where it is reflected three times and then leaves the reflective element 3 along the second optical axis 6.

FIG. 3 shows a measuring device according to FIGS. 1 and 2 in an example of a practical embodiment.

In the embodiment example shown in FIG. 3, identical or similarly acting elements are marked with the same reference symbols as in FIGS. 1 and 2.

In the embodiment shown in FIG. 3, the measuring device 1 also has transmitting optics 11 in the form of a parabolic mirror, through which a laser beam generated by the radiation device 2 can be shaped. Furthermore, the measuring device 1 has receiving optics 12 in the form of a parabolic mirror, through which a laser beam reflected by the reflective element 3 can be shaped before it reaches the detection element 4.

The measuring device 1 as shown in FIG. 3 has a steel housing 13 in which the radiation device 2, the transmitting optics 11, the reflective element 3, the receiving optics 12, the detection element 4 and the evaluation electronics 9 are arranged. Furthermore, the measuring device 1 comprises a flange 14, via which the measuring device 1 can be attached to a device (not shown). In particular, this device can be a device which comprises a gas mixture with a gas to be measured by the measuring device 1.

The measuring device 1 according to FIG. 3 also comprises a probe 15 which can be inserted into the gas mixture to be analyzed. The probe 15 is appropriately designed so that it can be inserted into the gas mixture when the measuring device 1 is attached to the device via the flange 14. The probe 15 has elongated openings 16 in the form of process windows.

A section of the first optical axis 5 and the second optical axis 6 extend through the probe 15, whereby a laser beam traveling along these sections can be guided through a gas mixture by the gas mixture penetrating into the probe 15 via the openings 16 in the probe 15.

The radiation device 2, the transmitting optics 11, the receiving optics 12, the detection element 4 and the evaluation electronics 9 are arranged in a specially protected housing 17 of the measuring device. The housing 17 is shielded from the probe 15 by glass windows 18, 19 that are transparent to the laser beam generated by the radiation device 2.

The measuring device 1 according to FIG. 3 also has a device (not shown) for emitting a purge gas, by means of which the reflective element 3 can be flushed with a purge gas.

In practical use, the measuring device 1 shown in FIG. 3 is used as follows. A laser beam generated by the radiation device 2 is shaped and deflected by the transmission optics 11 and transmitted along the first optical axis 5 through the two glass windows 18, 19 to the reflective element 3. The laser beam is reflected by the reflective element 3 and transmitted along the second optical axis 6 through the two windows 18, 19 to the detection element 4. Before arriving at the detection element 4, the laser beam is shaped and deflected by the receiving optics 12. The laser beam is detected by the detection element 4 and an electrical signal generated in the process is transmitted to the evaluation electronics 9. The evaluation electronics perform a gas measurement based on the detection of the detection element 4.

On the section of the first optical axis 5 and the second optical axis 6, which passes through the probe 15, the laser beam is guided through the gas mixture to be analyzed, whereby the signal strength of the laser beam decreases, as explained above, due to the interaction with formaldehyde. Based on this decrease in the signal strength of the laser beam, the concentration of formaldehyde in the gas mixture is determined, as explained above.

What is claimed is:

1. A measuring device for absorption-spectroscopic gas measurement, comprising:
    a radiation device configured to generate a laser beam;
    a reflective element configured to reflect the generated laser beam;
    at least one detection element configured to detect the reflected laser beam;
    a first optical axis along which the generated laser beam is guided to the reflective element; and
    a second optical axis along which the reflected laser beam is guided to the at least one detection element,
    wherein the reflective element is selected from the group consisting of spinel, polycrystalline aluminum oxide, and aluminum oxynitride, and
    wherein the reflective element has a coating selected from the group consisting of $Al_2O_3/SiO_2$, $TiO_2/Al_2O_3$, $TiO_2/SiO_2$, $Ta_2O_5$, and $MgF_2$.

2. The measuring device according to claim 1, wherein the reflective element is a retroreflector.

3. The measuring device according to claim 1, wherein the reflective element has an incident surface configured to introduce the generated laser beam into the reflective element, and
    wherein the incident surface is designed as a flat surface which is aligned at an angle not equal to 90° to the first optical axis.

4. The measuring device according to claim 1, wherein the radiation device is a laser diode.

5. The measuring device according to claim 4, wherein the laser diode is tunable.

6. The measuring device according to claim 5, wherein the laser diode is tunable over 2.0 μm to 5.0 μm.

7. The measuring device according to claim 1, wherein the at least one detection element comprises at least one photodetector.

8. The measuring device according to claim 1, wherein the generated laser beam is guided along a section of the first optical axis through a gas mixture.

9. The measuring device according to claim 8, wherein the generated laser beam is further guided through the gas mixture along a section of the second optical axis.

10. The measuring device according to claim 8, further comprising:

a probe in which the section of the first optical axis extends.

11. The measuring device according to claim 9, further comprising:

a probe in which the section of the first optical axis and the section of the second optical axis extend.

12. The measuring device according to claim 1, further comprising:

a pure gas delivering device configured to flush the reflective element with a purge gas.

13. A method of reflecting a laser beam in a measuring device for absorption-spectroscopic gas measurement, the method comprising:

providing a reflective element to reflect the laser beam, the reflective element being selected from the group consisting of spinel, polycrystalline aluminum oxide, and aluminum oxynitride, wherein the reflective element has a coating selected from the group consisting of $Al_2O_3/SiO_2$, $TiO_2/Al_2O_3$, $TiO_2/SiO_2$, $Ta_2O_5$, and $MgF_2$.

14. A method for absorption-spectroscopic gas measurement, comprising:

A. providing a measuring device for the absorption-spectroscopic gas measurement, the measuring device including a radiation device, a reflective element configured to reflect a laser beam generated by the radiation device, at least one detection element configured to detect the reflected laser beam, a first optical axis along which the generated laser beam is guided to the reflective element, and a second optical axis along which the reflected laser beam is guided to the at least one detection element, the reflective element being selected from the group consisting of spinel, polycrystalline aluminum oxide, and aluminum oxynitride;

B. generating, via the radiation device, the laser beam;

C. detecting, via the at least one detection element, the generated laser beam; and D. conducting, based on the detecting of the generated laser beam, a gas measurement, wherein the reflective element has a coating selected from the group consisting of $Al_2O_3/SiO_2$, $TiO_2/Al_2O_3$, $TiO_2/SiO_2$, $Ta_2O_5$, and $MgF_2$.

* * * * *